United States Patent
Wilkie, II et al.

(10) Patent No.: US 7,450,369 B2
(45) Date of Patent: Nov. 11, 2008

(54) SAFETY SWITCH WITH INTEGRATED AUXILIARY POWER SUPPLY AND CONVENIENCE RECEPTACLE

(75) Inventors: William E. Wilkie, II, Cleveland, TN (US); Richard D. Prohaska, Cleveland, TN (US); Warren C. Sipe, Cleveland, TN (US); Mark W. Schmidt, Aliquippa, PA (US); Brendan A. Foley, Cleveland, TN (US); Douglas R. Bender, Cleveland, TN (US); Eddie D. Carson, Cleveland, TN (US)

(73) Assignee: Eaton Corporation, Cleveland, OH (US)

( * ) Notice: Subject to any disclaimer, the term of this patent is extended or adjusted under 35 U.S.C. 154(b) by 525 days.

(21) Appl. No.: 11/215,266

(22) Filed: Aug. 30, 2005

(65) Prior Publication Data
US 2007/0049114 A1 Mar. 1, 2007

(51) Int. Cl.
*G08B 21/00* (2006.01)
(52) U.S. Cl. .................. 361/642; 361/622; 361/623; 361/667; 307/37; 307/38; 307/9.1; 307/154; 337/215; 200/51 R; 200/50.28; 200/51.04
(58) Field of Classification Search ................ 361/62, 361/622–631, 642–647, 667, 676–679, 65, 361/141, 143, 56.11; 200/31, 50.28, 51.04; 307/9.1, 15–29, 154–156
See application file for complete search history.

(56) References Cited

U.S. PATENT DOCUMENTS

| | | | |
|---|---|---|---|
| 3,857,044 A * | 12/1974 | Papoi et al. | 307/9.1 |
| 4,724,512 A | 2/1988 | Bischof et al. | |
| 4,937,730 A * | 6/1990 | Marcie et al. | 363/141 |
| 5,404,266 A * | 4/1995 | Orchard et al. | 361/667 |
| 5,764,502 A * | 6/1998 | Morgan et al. | 363/65 |
| 6,031,446 A | 2/2000 | Prohaska et al. | |
| 6,373,009 B1 | 4/2002 | Prohaska et al. | |
| 6,912,123 B2 * | 6/2005 | Sakai et al. | 361/683 |
| 2005/0174708 A1 * | 8/2005 | Price et al. | 361/62 |

* cited by examiner

*Primary Examiner*—Michael V Datskovskiy
(74) *Attorney, Agent, or Firm*—Martin J. Moran

(57) ABSTRACT

An enclosed switching apparatus includes an enclosure and a primary power supply disconnect mounted in the enclosure. The primary power supply disconnect has first and second terminals, the first terminals are electrically connectable to a primary power source and the second terminals are electrically connectable to a load. An auxiliary power supply unit includes an auxiliary power supply disconnect having third and fourth terminals. The third terminals are electrically connectable to the primary power source. A transformer has fifth and sixth terminals, the fifth terminals are electrically connected to the fourth terminals of the auxiliary power supply disconnect. An auxiliary fusible element has seventh and eighth terminals, the seventh terminal is electrically connected to one of the sixth terminals of the transformer. A receptacle has ninth terminals thereon. One of the ninth terminals is electrically connected to the eighth terminal of the auxiliary fusible element.

23 Claims, 8 Drawing Sheets

SAFETY SWITCH WITH INTEGRATED AUXILIARY POWER SUPPLY AND CONVENIENCE RECEPTACLE

BACKGROUND OF THE INVENTION

1. Field of the Invention

The present invention relates generally to electrical switching apparatus and, more particularly, to electrical switching apparatus such as safety switches.

2. Background Information

Many load devices, such as motors, compressors, pumps, fans, and HVAC units, operate, for example, at voltages of 208 volts, 240 volts, or 480 volts. Applicable safety codes may require the use of a local disconnect in the power distribution circuit for such load devices. A local disconnect is used to isolate the incoming power supply line from the load device and is typically installed in close proximity to the load device. The local disconnect affords an added level of safety, for example, to a technician performing maintenance on the load device.

The technician may employ one or more electrically powered hand tools (e.g., without limitation, saw; drill; grinder) while performing maintenance on the load device. Most electrically powered hand tools, however, utilize a 120 volt power supply. Thus, it is desirable to have a 120 volt convenience outlet located near the load device for ready access by the technician and/or by another who employs a device needing a 120 volt power supply in proximity to the load device. In many applications, however, the load device may be located in a remote area where the only power source within close proximity is that of the higher voltage supplied to the load device itself.

For example, HVAC units are often located on a building's roof where a 120 volt convenience outlet is not readily available. In the past, a technician attempting to service the HVAC unit needed to locate a 120 volt outlet (possibly on another floor), obtain one or more extension cords, and route the extension cords over a great distance to the outlet. In an attempt to address this problem, applicable codes now require that a 120 volt convenience receptacle be located within twenty-five feet of any roof-top mounted HVAC unit. Typically, to comply with the code requirements, an outlet is installed near the HVAC unit and a separate 120 volt circuit is run from the outlet to a distant 120 volt supply source. Due to the additional material and labor, however, installation of the separate 120 volt circuit may be cost prohibitive.

Thus, a need exists for an improved apparatus for providing a 120 volt convenience receptacle within an acceptable proximity to a load device.

SUMMARY OF THE INVENTION

These needs and others are met by the present invention, which is directed to an enclosed switching apparatus which comprises an enclosure, a primary power supply disconnect, and an auxiliary power supply unit. The primary power supply disconnect is mounted in the enclosure, the primary power supply disconnect has first and second terminals, the first terminals being electrically connectable to a primary power source and the second terminals being electrically connectable to a load. The auxiliary power supply unit comprises an auxiliary power supply disconnect, a transformer, an auxiliary fusible element, and a receptacle. The auxiliary power supply disconnect has third and fourth terminals, the third terminals being electrically connectable to the primary power source. The transformer has fifth and sixth terminals, the fifth terminals being electrically connected to the fourth terminals of the auxiliary power supply disconnect. The auxiliary fusible element has seventh and eighth terminals, the seventh terminal being electrically connected to one of the sixth terminals of the transformer. The receptacle has ninth terminals thereon, one of the ninth terminals being electrically connected to the eighth terminal of the auxiliary fusible element.

As another aspect of the invention, a safety switch includes a primary power supply unit, a receptacle, an auxiliary power supply unit, and an enclosure. The primary power supply unit is electrically connectable between a first power supply line carrying a first voltage and a load operating at the first voltage. The auxiliary power supply unit is electrically connectable between the first power supply line carrying the first voltage and the receptacle. The auxiliary power supply provides a second voltage to the receptacle. The enclosure comprises a first compartment containing the primary power supply unit and a second compartment containing the auxiliary power supply unit.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1A:
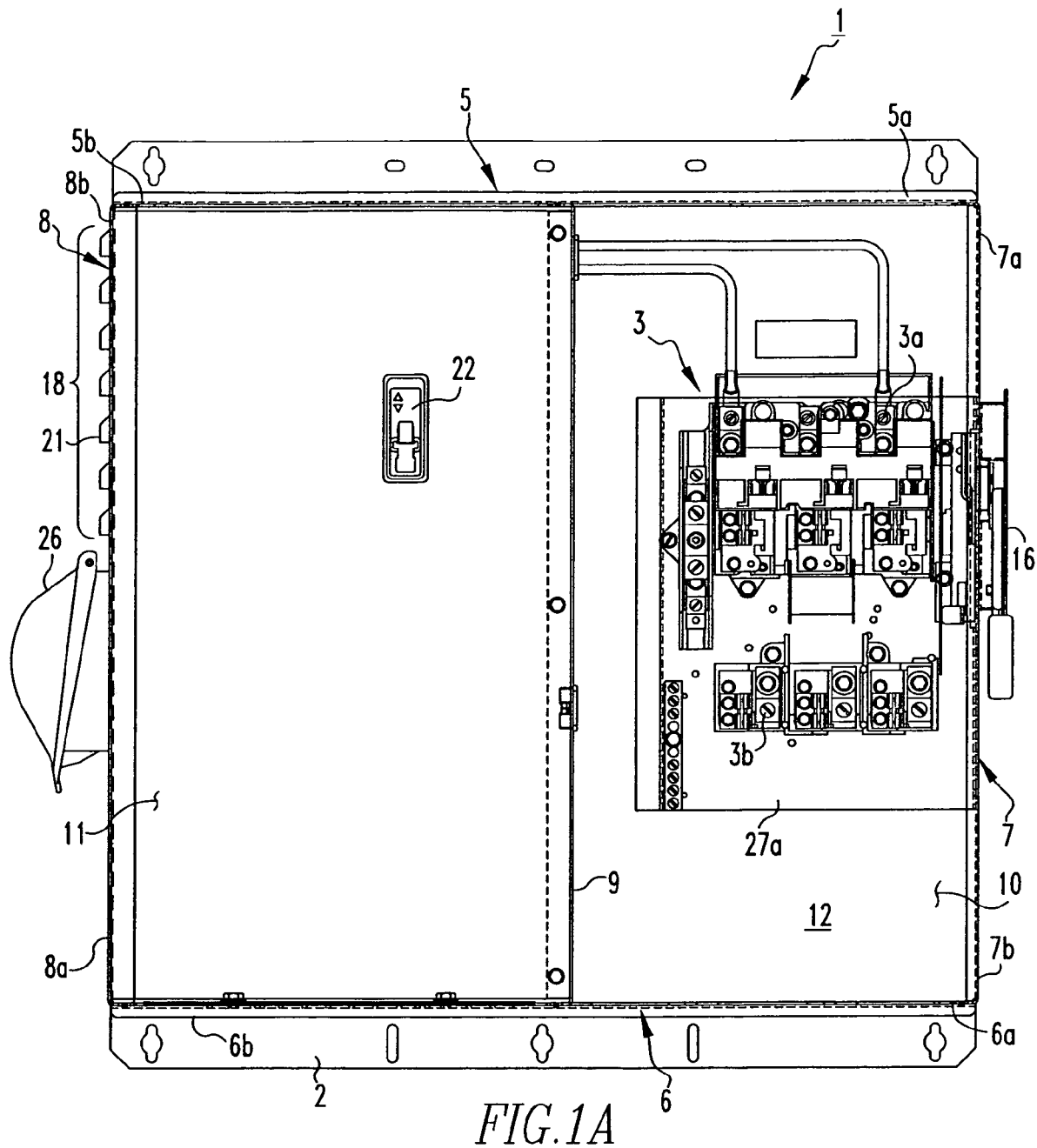
FIG. 1A is a front elevational view of an enclosed switching apparatus with an inner panel installed according to one embodiment of the invention.

Directional phrases used herein, such as, for example, left, right, clockwise, counterclockwise and derivatives thereof, relate to the orientation of the elements shown in the drawings and are not limiting upon the claims unless expressly recited therein. Additionally, as employed herein, the term "number" shall mean one or more than one (i.e., a plurality).

Figure 1B:
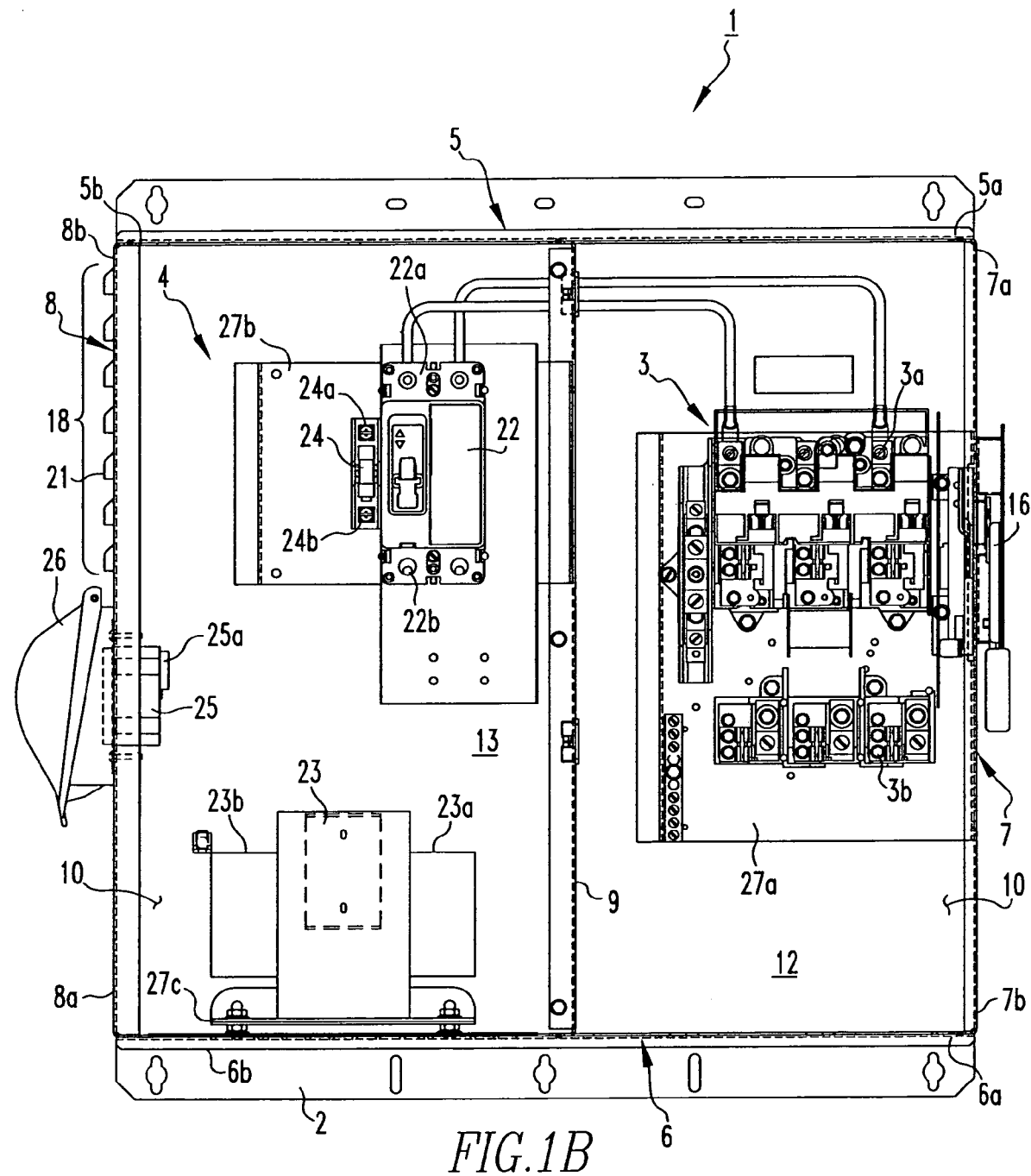
FIG. 1B is a front elevational view of the enclosed switching apparatus of FIG. 1A with the inner panel removed.

FIGS. 1A-1B, 2, 3, and 4, respectively, illustrate front, left, right and bottom views of an enclosed switching apparatus 1 according to one embodiment. The enclosed switching apparatus 1 includes an enclosure 2, a primary power supply disconnect 3, and an auxiliary power supply unit 4 (FIG. 1B).

The enclosure 2 may be constructed of any acceptable material (for example, carbon steel; stainless steel; fiberglass reinforced thermoset polyester; plastic). As best seen in FIGS. 1A and 1B, the enclosure 2 includes a top wall 5, a bottom wall 6, a first side wall 7, a second side wall 8, an interior wall 9, and a back wall 10 which are arranged in relation to each other to form first and second compartments 12, 13 (FIG. 1B). More specifically, a first end 5a of the top wall 5 is connected to a first end 7a of the first side wall 7, a second end 7b of the first side wall 7 is connected to a first end 6a of the bottom wall 6, a second end 6b of the bottom wall 6 is connected to a first end 8a of the second side wall 8, and a second end 8b of the second side wall 8 is connected to a second end 5b of the top wall 5. Each of the top wall 5, the bottom wall 6, the first side wall 7, and the second side wall 8 extend from the back wall 10. The interior wall 9 also extends from the back wall 10. The top wall 5, bottom wall 6, first side wall 7, back wall 10, and interior wall 9 define the first compartment 12. Likewise, the top wall 5, bottom wall 6, second side wall 8, back wall 10, and interior wall 9 define the second compartment 13.

The enclosure 2 may include an inner panel 11 (FIG. 1A) mounted opposite the back wall 10 and structured to cover at least a portion of either the first compartment 12, the second compartment 13, or the first and second compartments 12, 13. FIG. 1A illustrates the enclosed switching apparatus 1 with the inner panel 11 of the enclosure 2 installed; whereas FIG. 1B illustrates the enclosed switching apparatus 1 with the inner panel 11 removed. As best seen in FIG. 1A, the inner panel 11 is structured to cover the second compartment 13 (FIG. 1B) while simultaneously providing access to an auxiliary power supply disconnect 22.

Figure 2:
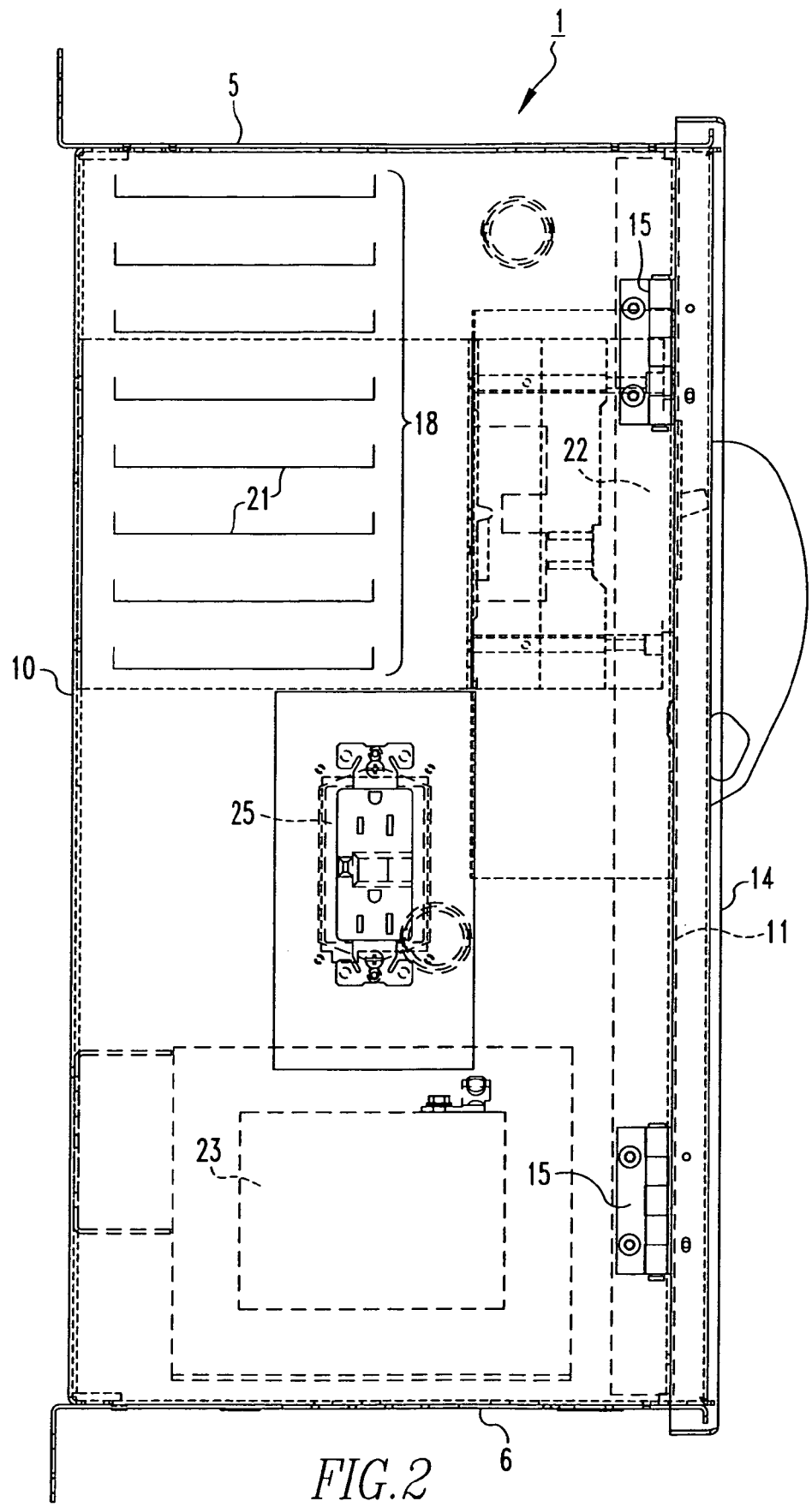
FIG. 2 is a left-side elevational view of the enclosed switching apparatus of FIG. 1A.
Figure 5:
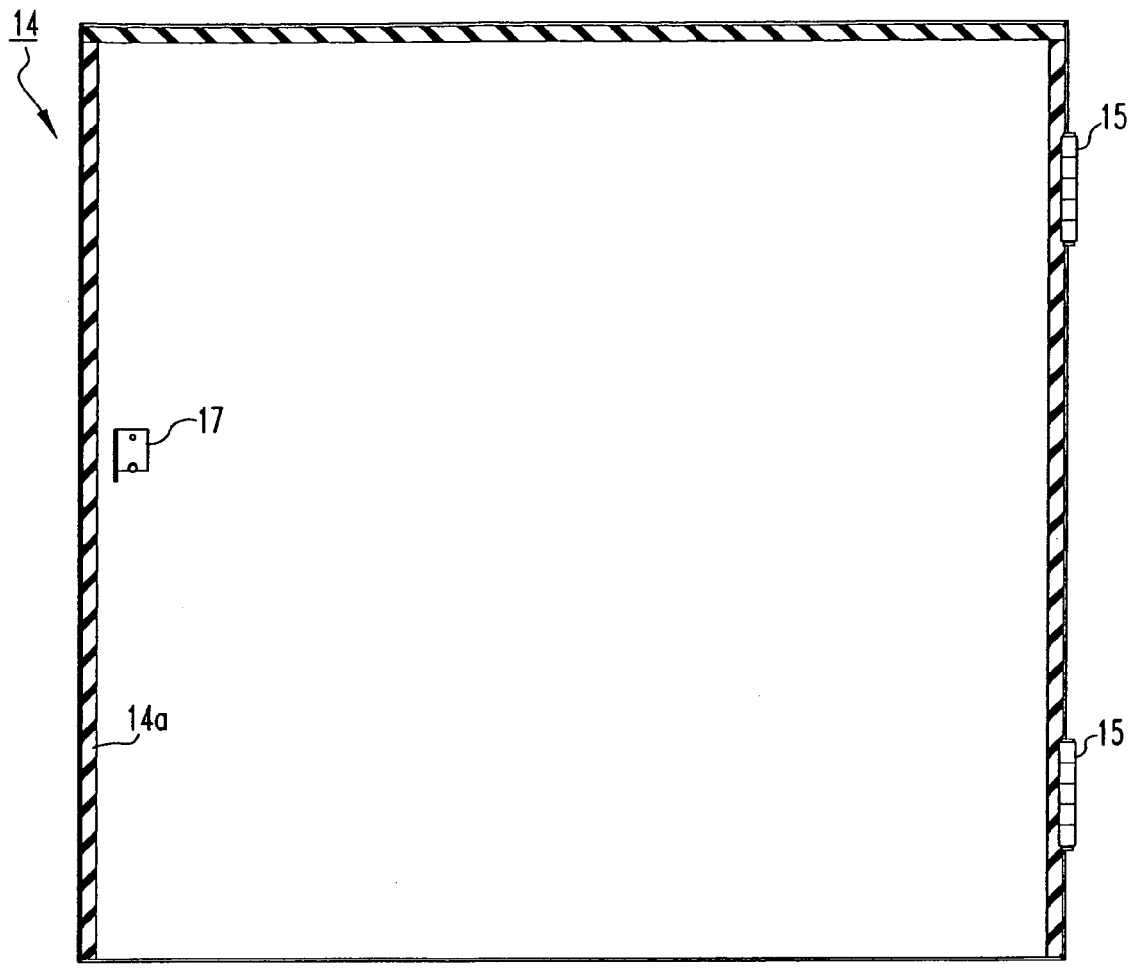
FIG. 5 is a rear elevational view of a door for the enclosed switching apparatus of FIG. 1A.

The enclosure 2 also includes a door 14, which is best illustrated in FIG. 5 (the door 14 is shown as being transparent in FIGS. 1A and 1B to better illustrate the other components of the switching apparatus 1). The door 14 includes a number of hinges 15 for attaching the door to another portion of the enclosure 2. For example, the door 14 is attached to the second side wall 8 (as best illustrated in FIG. 2). It should be apparent that other attachment mechanisms may be used while remaining within the scope of the present invention. Additionally, the door 14 may attached to any of the top wall 5, bottom wall 6, first side wall 7, or second side wall 8 without departing from the scope of the present invention.

When in a closed position, the door 14 (FIG. 5) is structured to cover the first and second compartments 12, 13. The door may include a door gasket 14a which aids in sealing the enclosure 2 when the door 14 is in the closed position. The door gasket 14a may be made from any acceptable material (for example, polyurethane; rubber; neoprene). It should be noted that the door gasket 14a may be mounted directly on the door 14 (as shown in FIG. 5) or mounted around the enclosure opening while remaining within the scope of the present invention.

Figure 3:
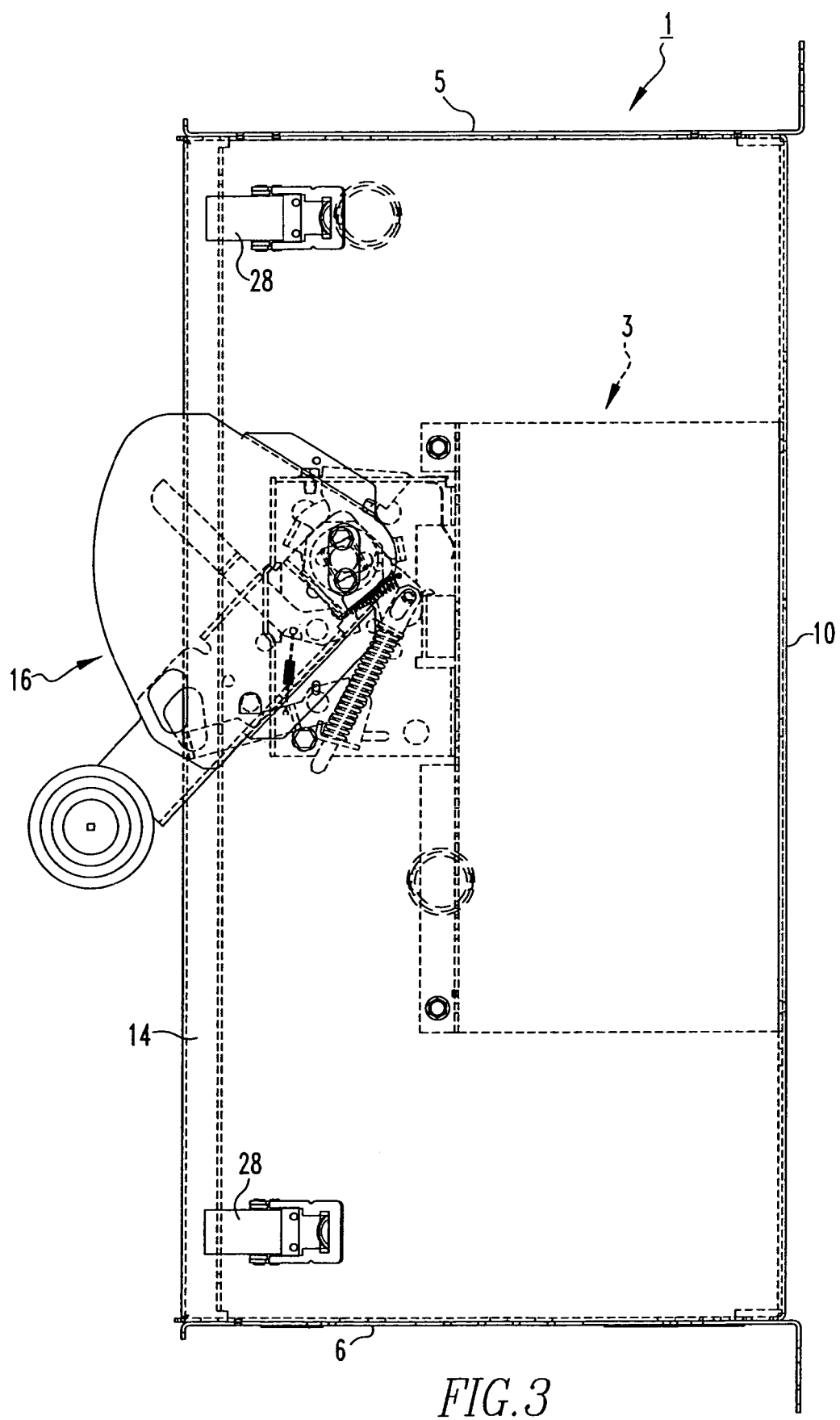
FIG. 3 is a right-side elevational view of the enclosed switching apparatus of FIG. 1A.

The door 14 also includes a safety latch 17 mounted opposite the hinges 15. The safety latch 17 is structured to engage a locking mechanism 16 (FIGS. 1A-1B and 3) when the door 14 is in the closed position and the primary disconnect is closed. As illustrated in FIG. 1A, the locking mechanism 16 is mounted on the first side wall 7. The engagement of the safety latch 16 and locking mechanism 16 maintains the door 14 in the closed position when the primary disconnect is closed. A number of clasps 28 (as best seen in FIG. 3) may be used in conjunction with or in place of the locking mechanism 16 and safety latch 17 for securing the door 14 in the closed position.

Figure 4:
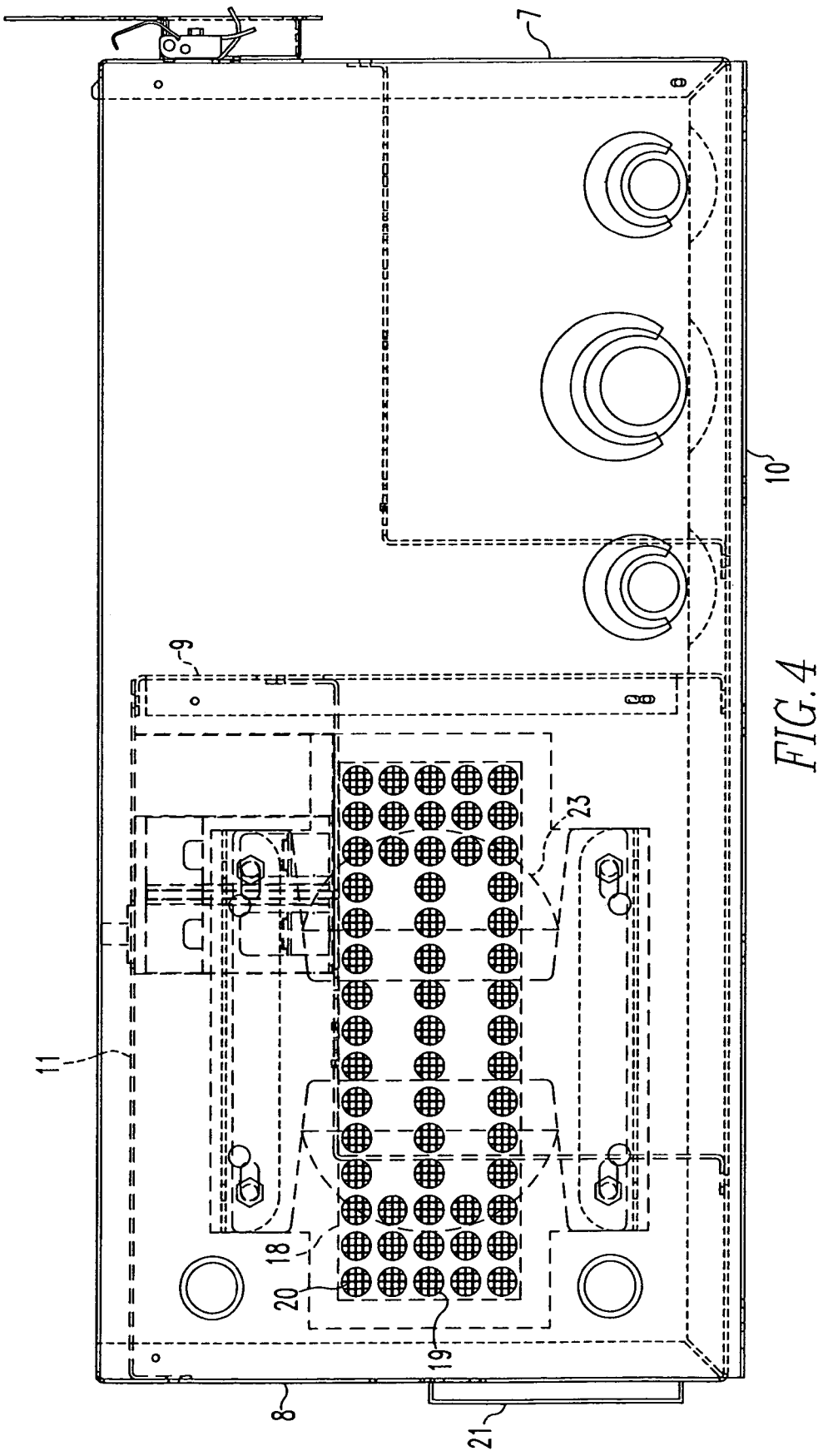
FIG. 4 is a bottom plan view of the enclosed switching apparatus of FIG. 1A.

The enclosure 2 is equipped with a number of ventilation devices 18 for promoting heat dissipation. It should be apparent that the ventilation devices 18 may be omitted when desired, for example, for enclosures used in explosive atmospheres and/or in areas requiring that the enclosure be washed down. In the example embodiment, ventilation devices 18 are provided on the bottom wall 6 and the second side wall 8, however, the number and location of the ventilation devices 18 may be altered while remaining within the scope of the invention. As best seen in FIG. 4, the ventilation devices 18 include a number of openings 19 and a screen material 20. The openings 19 permit air to flow into and out of the enclosure 2. The screen material 20 prevents insects and small animals from entering the enclosure 2 via the openings without blocking the air flow. As best seen in FIGS. 1A-1B, the ventilation device 18 located at the second side wall 8 also includes a number of louvers 21 which provide an extra degree of moisture ingress protection.

Referring to FIG. 1B, the primary power supply disconnect 3 is mounted in the first compartment 12 of the enclosure 2. The primary power supply disconnect 3 has terminals 3a and 3b. The terminals 3a are electrically connectable to a primary power source (not shown) and the terminals 3b are electrically connectable to a load device (not shown). In the current embodiment, the primary power source supplies the voltage (for example, without limitation, 208 volts; 480 volts; 240 volts) employed to operate the load device (e.g., motors; compressors; pumps; fans; HVAC units or as a service disconnect to a panel). The example primary power supply disconnect 3 is a 3-pole fused switch disconnect, however, a wide range of other types of disconnects (for example, unfused disconnects, molded case "switch" type disconnects, ground fault circuit breaker, and/or circuit breakers) may be used while remaining within the scope of the present invention. The primary power supply disconnect 3 is mounted, for example, to a bracket 27a which is, in turn, mounted to the back wall 10 in the first compartment 12.

The auxiliary power supply unit 4 includes an auxiliary power supply disconnect 22, a transformer 23, an auxiliary fusible element 24, and a receptacle 25. The auxiliary power supply unit 4 is mounted, for example, to a bracket 27b which is, in turn, mounted to the back wall 10 in the second compartment 13. Likewise, the transformer 23 is mounted, for example, to a support bracket 27c which is, in turn, mounted to the bottom wall 6 in the second compartment 13.

Figure 7A:
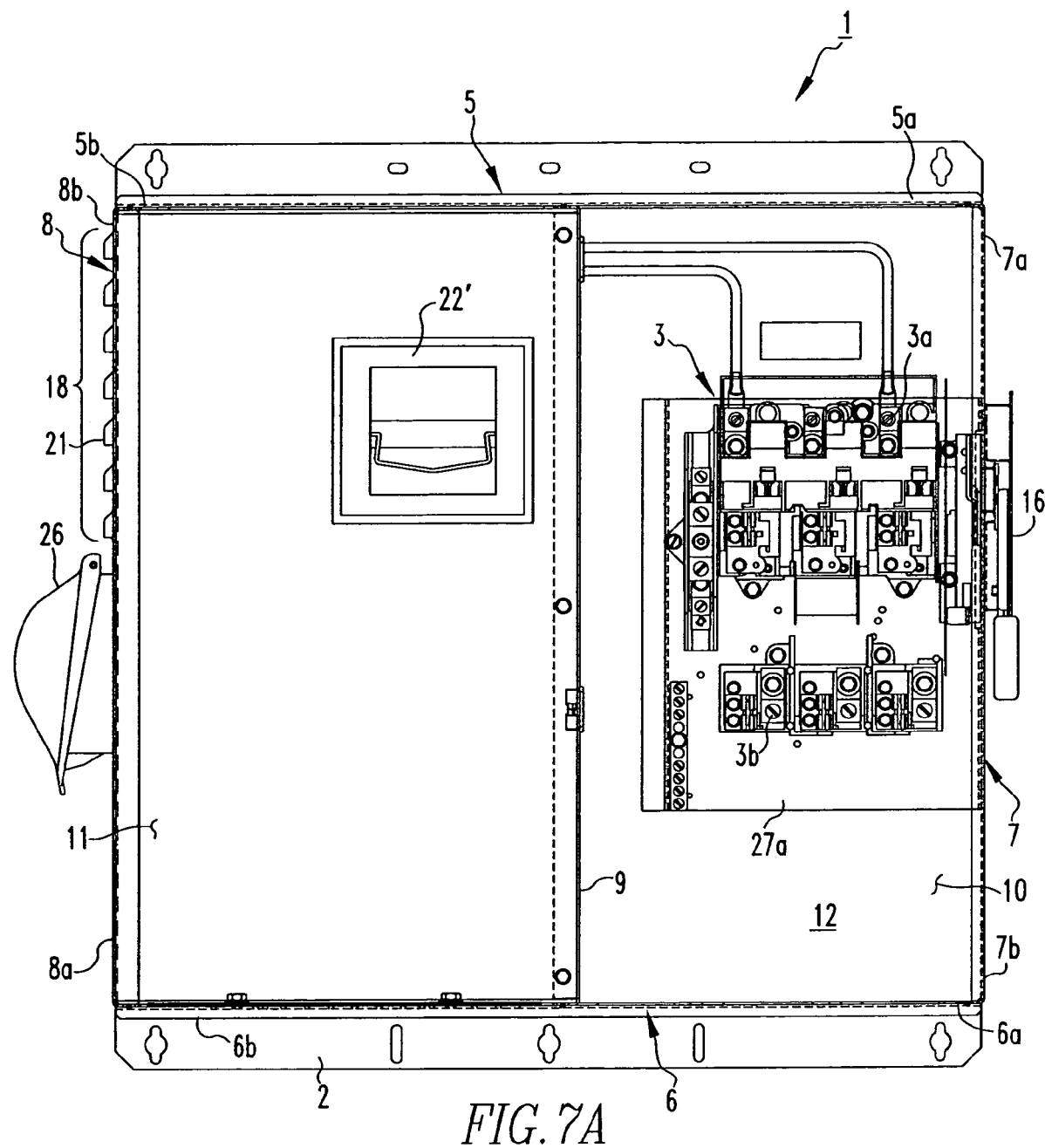
FIG. 7A is a front elevational view of an enclosed switching apparatus with an inner panel installed according to another embodiment.
Figure 7B:
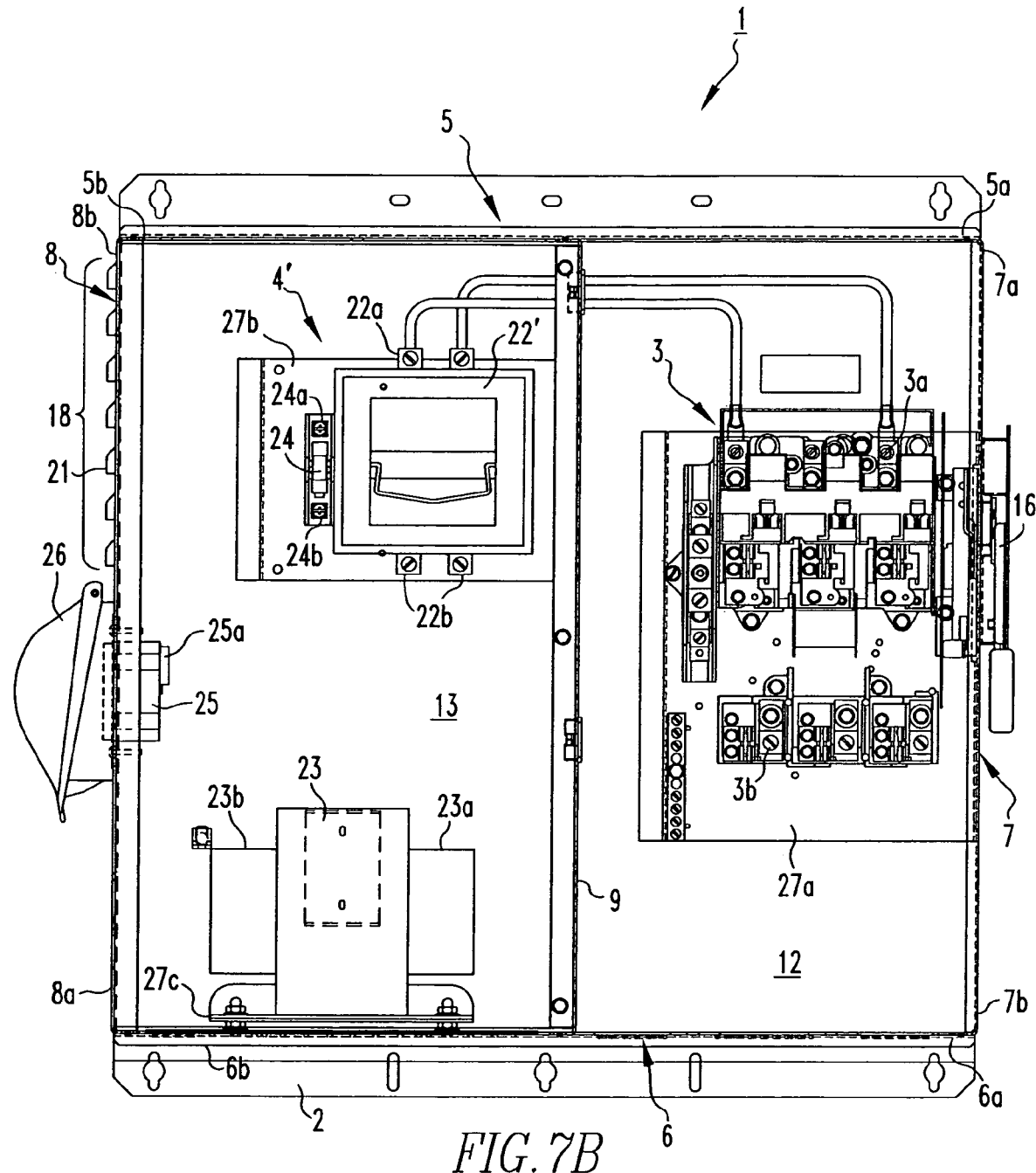
FIG. 7B is a front elevational view of the enclosed switching apparatus of FIG. 7A with the inner panel removed.

In FIG. 1B, the example auxiliary power supply disconnect 22 is a circuit breaker type disconnect. However, the auxiliary power supply disconnect 22 may be one of a ground fault circuit breaker, a manual disconnect (as shown in FIGS. 7A-7B), a fused disconnect, and/or an unfused disconnect, among others.

Figure 6:
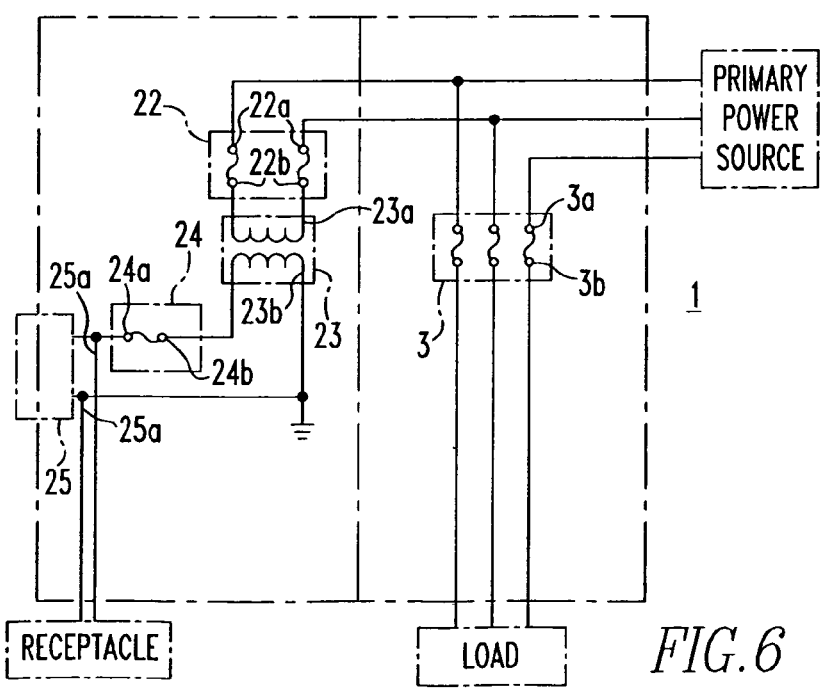
FIG. 6 is a schematic illustrating the electrical connections of the enclosed switching apparatus of FIG. 1A.

The auxiliary power supply disconnect 22 has terminals 22a, 22b. Terminals 22a are electrically connectable to the primary power source (not shown). Transformer 23 has terminals 23a, 23b. Terminals 23a are electrically connected (as shown in FIG. 6) to terminals 22b of the auxiliary power supply disconnect 22. Auxiliary fusible element 24 has terminals 24a, 24b. Terminal 24a is electrically connected (as shown in FIG. 6) to one of the terminals 23b of transformer 23. Receptacle 25 has terminals 25a thereon; one of the terminals 25a is electrically connected (as shown in FIG. 6) to the terminal 24b of the auxiliary fusible element 24. The other terminal 25a is grounded to the enclosure 2 and connected to the other terminal of 23b.

For clarity, most of the electrical connections for the enclosed switching apparatus 1 are not shown in FIG. 1B. FIG. 6, however, provides a schematic illustration of the electrical connections of the enclosed switching apparatus 1 as discussed above.

As best seen in FIGS. 1B and 2, receptacle 25 is mounted to the second side wall 8 and is accessible from outside of the enclosure 2. Although shown mounted to the second side wall 8 in this example, the receptacle 25 may alternatively be mounted to the top wall 5, the bottom wall 6, the first side wall 7, the back wall 10, or the door 14. A receptacle cover 26 (as best seen in FIGS. 1A-1B) is mounted on the outside of the enclosure 2 to provide ingress protection for the receptacle 25. It should be noted that more than one receptacle may be provided while remaining within the scope of the invention. For example, a receptacle may be mounted on each of the bottom wall 10 and the second side wall 8. Additionally, a receptacle may be mounted on the interior wall 9; this receptacle being accessible from the first compartment 12 when the door 14 is in the open position.

The enclosed switching apparatus 1 may also include a remotely mounted receptacle (not shown) electrically connected to at least one of the terminals 25a of the receptacle 25 and/or the terminal 24b of the auxiliary fusible element 24. The enclosure 2 may include a number of knock-outs (e.g., in the second side wall 8) for allowing one or more conductors to be routed from terminals 25a and/or terminal 24b to the terminals of the remotely mounted receptacle.

FIGS. 7A-7B illustrate another auxiliary power supply unit 4' having a manual disconnect for an auxiliary power supply disconnect 22'.

As a further example, the transformer 23 may be omitted from the auxiliary power supply unit 4' where the primary power source (not shown) is at 208 volts. More specifically, the auxiliary power supply disconnect 22' may be electrically connected to a single phase of the 208 volt supply, thus eliminating the need for the transformer 23.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An enclosed switching apparatus, comprising:
   an enclosure;
   a primary power supply disconnect mounted in said enclosure, said primary power supply disconnect having first and second terminals, said first terminals being electrically connectable to a primary power source and said second terminals being electrically connectable to a load; and
   an auxiliary power supply unit comprising:
      an auxiliary power supply disconnect having third and fourth terminals, said third terminals being electrically connectable to said primary power source;
      a transformer having fifth and sixth terminals, said fifth terminals being electrically connected to said fourth terminals of said auxiliary power supply disconnect;
      an auxiliary fusible element having seventh and eighth terminals, said seventh terminal being electrically connected to one of said sixth terminals of said transformer; and
      a receptacle having ninth terminals thereon, one of said ninth terminals being electrically connected to said eighth terminal of said auxiliary fusible element.

2. The enclosed switching apparatus of claim 1 wherein said enclosure comprises:
   a top wall, a bottom wall, a first side wall, and a second side wall, wherein a first end of said top wall is connected to a first end of said first side wall, a second end of said first side wall is connected to a first end of said bottom wall, a second end of said bottom wall is connected to a first end of said second side wall, and a second end of said second side wall is connected to a second end of said top wall, and wherein each of said top wall, said bottom wall, said first side wall, and said second side wall extend from a back wall; and
   an interior wall extending from said back wall, wherein said top wall, said bottom wall, said first side wall, said back wall, and said interior wall define a first compartment and wherein said top wall, said bottom wall, said second side wall, said back wall, and said interior wall define a second compartment.

3. The enclosed switching apparatus of claim 2 wherein said primary power supply disconnect is contained within said first compartment and said auxiliary power supply unit is contained within said second compartment.

4. The enclosed switching apparatus of claim 2 wherein said enclosure further comprises an inner panel mounted opposite said back wall and covering at least a portion of said second compartment.

5. The enclosed switching apparatus of claim 2 wherein said enclosure further comprises a door hingeably attached to one of said top wall, said bottom wall, said first side wall, and said second side wall; and, wherein said door, when in a closed position, covers said first and second compartments.

6. The enclosed switching apparatus of claim 5 wherein said enclosure further comprises
   a locking mechanism associated with said door; and
   a safety latch for engaging said locking mechanism when said door is in said closed position and a primary power disconnect switch is in a closed "ON" position.

7. The enclosed switching apparatus of claim 5 wherein said enclosure further includes a ventilation device disposed on at least one of said top wall, said bottom wall, said first side wall, said second side wall, said back wall, and said door.

8. The enclosed switching apparatus of claim 1 wherein said receptacle is accessible from outside of said enclosure.

9. The enclosed switching apparatus of claim 8 wherein said enclosure further comprises a receptacle cover mounted on the outside of said enclosure, said receptacle cover operable to provide ingress protection for said receptacle.

10. An enclosed switching apparatus, comprising:
    an enclosure;
    a primary power supply disconnect mounted in said enclosure, said primary power supply disconnect having first and second terminals, said first terminals being electrically connectable to a primary power source and said second terminals being electrically connectable to a load;
    an auxiliary power supply unit comprising:
       an auxiliary power supply disconnect having third and fourth terminals, said third terminals being electrically connectable to said primary power source;
       a transformer having fifth and sixth terminals, said fifth terminals being electrically connected to said fourth terminals of said auxiliary power supply disconnect;
       an auxiliary fusible element having seventh and eighth terminals, said seventh terminal being electrically connected to one of said sixth terminals of said transformer; and
       a receptacle having ninth terminals thereon, one of said ninth terminals being electrically connected to said eighth terminal of said auxiliary fusible element; and
    a remotely mounted receptacle electrically connected to at least one of said terminals of said receptacle and said eighth terminal of said auxiliary fusible element.

11. The enclosed switching apparatus of claim 1 wherein said auxiliary power supply disconnect is one of a ground fault circuit breaker, a manual disconnect, a circuit breaker, a fused disconnect, an unfused disconnect, and a molded case "switch" type disconnect.

12. A safety switch comprising:
a primary power supply unit electrically connectable between a first power supply line carrying a first voltage and a load operating at said first voltage;
a receptacle;
an auxiliary power supply unit electrically connectable between said first power supply line carrying said first voltage and said receptacle, said auxiliary power supply providing a second voltage to said receptacle; and
an enclosure comprising a first compartment containing said primary power supply unit and a second compartment containing said auxiliary power supply unit.

13. The safety switch of claim 12 wherein said enclosure further comprises:
a top wall, a bottom wall, a first side wall, and a second side wall, wherein a first end of said top wall is connected to a first end of said first side wall, a second end of said first side wall is connected to a first end of said bottom wall, a second end of said bottom wall is connected to a first end of said second side wall, and a second end of said second side wall is connected to a second end of said top wall, and wherein each of said top wall, said bottom wall, said first side wall, and said second side wall extend from a back wall; and
an interior wall extending from said back wall, wherein said top wall, said bottom wall, said first side wall, said back wall, and said interior wall define said first compartment and wherein said top wall, said bottom wall, said second side wall, said back wall, and said interior wall define said second compartment.

14. The safety switch of claim 13 wherein said enclosure further comprises an inner panel mounted opposite to said back wall and covering at least a portion of said second compartment.

15. The safety switch of claim 13 wherein said enclosure further comprises a door hingeably attached to one of said top wall, said bottom wall, said first side wall, and said second side wall; and wherein said door, when in a closed position, covers said first and second compartments.

16. The safety switch of claim 15 wherein said enclosure further comprises:
a locking mechanism associated with said door; and
a safety latch for engaging said locking mechanism when said door is in said closed position and when a primary power disconnect switch is closed.

17. The safety switch of claim 15 wherein said receptacle is mounted to one of said top wall, said bottom wall, said second side wall, said back wall, said interior wall, and said door, said receptacle being accessible from outside of said enclosure.

18. The safety switch of claim 17 wherein said enclosure further comprises a receptacle cover mounted on the outside of said enclosure, said receptacle cover operable to provide ingress protection for said receptacle.

19. The safety switch of claim 15 wherein said enclosure further includes a ventilation device disposed on at least one of said top wall, said bottom wall, said first side wall, said second side wall, said back wall, and said door.

20. The safety switch of claim 12 wherein said auxiliary power supply unit comprises:
an auxiliary power supply disconnect;
a transformer;
a fusible element; and
a receptacle,
wherein said auxiliary power supply disconnect is electrically connectable to said first power supply line, said transformer is electrically connected to said auxiliary power supply disconnect, said fusible element is electrically connected to said transformer, and said receptacle is electrically connected to said fusible element.

21. The safety switch of claim 12 wherein said auxiliary power supply unit comprises:
an auxiliary power supply disconnect;
a fusible element; and
a receptacle,
wherein said auxiliary power supply disconnect is electrically connectable to said first power supply line, said fusible element is electrically connected to said auxiliary power supply disconnect, and said receptacle is electrically connected to said fusible element.

22. The enclosed switching apparatus of claim 1 wherein said primary power source has a first alternating current voltage; and wherein the ninth terminals of said receptacle have a second alternating current voltage, which is smaller than said first alternating current voltage.

23. The safety switch of claim 12 wherein the first voltage carried by said first power supply line is a first alternating current voltage; and wherein the second voltage provided by said auxiliary power supply to said receptacle is a second alternating current voltage, which is smaller than said first alternating current voltage.

* * * * *